United States Patent [19]
Korinsky

[11] Patent Number: 5,751,550
[45] Date of Patent: May 12, 1998

[54] ULTRA-QUIET, THERMALLY EFFICIENT COOLING SYSTEM FOR FORCED AIR COOLED ELECTRONICS

[75] Inventor: George K. Korinsky, The Woodlands, Tex.

[73] Assignee: Compaq Computer Corporation, Houston, Tex.

[21] Appl. No.: 633,134

[22] Filed: Apr. 16, 1996

[51] Int. Cl.$^6$ .................................... H05K 7/20
[52] U.S. Cl. .............................. 361/695; 361/690
[58] Field of Search .................... 361/683–695, 361/724–727, 732, 735, 741, 744, 756, 759, 801, 802, 825

[56] References Cited

U.S. PATENT DOCUMENTS

| | | | |
|---|---|---|---|
| 3,147,403 | 9/1964 | Cressman et al. | 361/687 |
| 4,359,085 | 11/1982 | Mueller | 361/694 |
| 4,489,363 | 12/1984 | Goldberg | 361/690 |
| 4,797,783 | 1/1989 | Kohmoto et al. | 361/688 |
| 4,979,075 | 12/1990 | Murphy | 361/825 |
| 5,375,038 | 12/1994 | Hardt | 361/694 |
| 5,457,602 | 10/1995 | Kimura et al. | 361/687 |
| 5,495,389 | 2/1996 | Dewitt et al. | 361/683 |

FOREIGN PATENT DOCUMENTS

| | | | |
|---|---|---|---|
| 4115599 | 4/1992 | Japan | 361/694 |
| 4209598 | 7/1992 | Japan | 361/695 |
| 4332196 | 11/1992 | Japan | 361/690 |
| 5160591 | 6/1993 | Japan | 361/695 |

*Primary Examiner*—Gregory D. Thompson
*Attorney, Agent, or Firm*—Konneker & Smith, P.C.

[57] ABSTRACT

A computer housing is provided with enhanced interior cooling, to dissipate operating heat from its heat generating internal electronic components, using a single cooling fan disposed inside the housing. During operation thereof the fan draws ambient cooling air into the housing through a hollow support foot attached to the underside of the housing, and the bottom end opening of a hollow front bezel structure, flows the cooling air through the housing and then discharges it therefrom. A pull-out option card carrier defines an interior housing baffle that routes a large portion of the interior housing air flow across the processor portion of the computer motherboard. Additionally, a smaller quantity of ambient cooling air is drawn through side wall openings in the housing into an interior plenum upon the inner side wall of which the motherboard is mounted. The plenum air is passed into the main housing interior through a transfer opening in the inner side wall and then drawn along the balance of the motherboard through a gap between the motherboard and the installed option card carrier.

33 Claims, 3 Drawing Sheets

ULTRA-QUIET, THERMALLY EFFICIENT COOLING SYSTEM FOR FORCED AIR COOLED ELECTRONICS

BACKGROUND OF THE INVENTION

1. Field of the Invention

The present invention generally relates to computer apparatus and, in a preferred embodiment thereof, more particularly relates to the internal cooling of computer housings.

2. Description of Related Art

Operatively disposed within the typical modern day computer housing are a variety of heat generating electronic devices such as circuit boards that carry high speed processors. Because of the potential for damaging or lessening the useful service life of these electronic devices if they are subjected to overheating within the housing it is necessary to provide the housing interior with a throughflow of cooling air during system operation. This requisite cooling air throughflow is conventionally accomplished by mounting one or more cooling fans within the housing interior and using the fan(s) to draw air into inlet openings formed in one or more vertical side wall portions of the housing, and through the housing interior, and then discharge the air through one or more housing wall outlet openings.

As processor speeds continue to increase with higher capacity circuitry, it of course becomes necessary to provide even more cooling air flow through the housing interior. In the past, conventional design wisdom has dictated that this increased cooling air flow be achieved by increasing the size and/or number of cooling fans within the housing. This, of course leads to several well known and heretofore unavoidable problems, limitations and disadvantages such as increased cost and complexity of the overall electronic apparatus, diminished space within the housing for additional operating components such as printed circuit boards, drives, etc., increased operating fan and air movement noise, and increased power consumption.

More specifically, as system electronics become more powerful they consequently dissipate more heat, and it therefore becomes more difficult to keep the electronics thermally compliant. Making matters worse, consumers continue to demand quieter and quieter units. This demand from consumers contradicts the need to increase air flow through the system. Engineers have been working to improve this with little success due to the fast paced increase of electronic component power dissipation. Safety agencies limit the area that can be vented from the computer housing due to potential fire hazards. Thus, in the past, as electronic power dissipation has increased so has cooling fan speed and size. This has decreased the life of the fans due to the increased fan speeds required, and the noise created by this approach has caused consumer complaints.

For particularly high power dissipation electrical components a finned heat sink is commonly designed to help dissipate the heat. Lately these components have required larger and larger heat sinks to keep the air flow requirements lower. The heat sinks have grown to very large sizes in the past several years in order to keep minimum fan speeds. Most recent heat sink designs have exceeded the limits of the socket that the electrical device is connected to. This has caused problems for factories producing the systems, the designers of the system boards, and the end users. It has also caused upgrade problems for the consumer. For example, most microprocessors have a socket they fit into which has a handle (zif socket). The handle needs to be able to rotate up (to insert and remove the processor) and down (to lock). Most heat sinks for these components have exceeded the limits of the socket causing the handle to be inaccessible. Therefore, this provides no good way of removing the processor once the heat sink is installed.

Another traditional approach to this ever-increasing heat dissipation requirement has been to dramatically increase the front intake vent on a system's front plastic bezel. This helps to increase air flow, but there is a limit to how much the front side vents can be opened. Industrial designers want to keep the vents from becoming an eyesore for the consumer. Additionally, safety agencies have a finger probe test that limits the size of the bezel front side opening. The visible vent area on a front bezel also hampers the industrial designer's ability to get a clean design that is aesthetically pleasing.

As can readily be seen from the foregoing, it has become increasingly desirable to provide improved apparatus for providing enhanced cooling air flow through a computer housing, or other types of electronic apparatus housings in which heat generating electronic components may be operatively disposed, in a manner eliminating or at least substantially reducing the above-mentioned problems, limitations and disadvantages of conventional approaches to providing such increased cooling air flow by increasing fan size and speed, or utilizing one or more of the other approaches described above. It is accordingly an object of the present invention to provide such improved apparatus.

SUMMARY OF THE INVENTION

In carrying out principles of the present invention, in accordance with a preferred embodiment thereof, the housing of an electronic apparatus, representatively a computer, is provided with an enhanced interior cooling flow to very efficiently dissipate operating heat generated by the various electronic devices, such as printed circuit boards, disposed within the housing. The enhanced cooling flow through the housing facilitates a reduction in the size of the computer cooling fan, the use of a single fan instead of the typically employed multiple fans, or the provision of a greater degree of interior housing cooling with a given size cooling fan.

According to one aspect of the present invention, the housing is restable on a generally horizontal support surface and has a bottom exterior wall portion, a first ventilation air inlet opening formed in the bottom exterior wall portion, a second exterior wall portion spaced apart from the bottom exterior wall portion, and ventilation air outlet opening means formed in the second exterior wall portion.

A hollow support foot structure depends from the bottom exterior housing wall and underlies the first ventilation air inlet opening. The foot structure preferably is configured to engage the support surface in a manner creating a vertical gap between the support surface and the underside of the housing. Cooling means, illustratively including a single cooling fan disposed within the housing, are provided and are operative to sequentially flow ambient air into the vertical gap, through the interior of the hollow foot structure, into the housing through the ventilation air inlet opening, and then outwardly from the housing through the ventilation air outlet opening means.

In a preferred embodiment thereof the hollow support foot has a body portion that comprises a bottom side surface portion restable on the support surface and lying generally in a first plane; an upstanding front end portion; an open top side securable to the underside portion of the housing beneath the aforementioned first ventilation air inlet opening; a base wall vertically interposed between the bottom side surface portion and the open top side and having an upwardly facing top side surface; and passage means for permitting ambient cooling air to sequentially flow inwardly into the interior of the hollow support foot above its base wall and then flow outwardly through its open top side into the housing through the first ventilation air inlet opening therein.

The base wall of the support foot body portion is preferably sloped downwardly and forwardly relative to the aforementioned first plane, and downwardly bounds a generally trough-shaped air flow passage extending through the support structure and opening outwardly through the open top side of the foot structure. The base wall serves to catch hot electronic component portions that may fall downwardly through the first ventilation air inlet opening.

The flow of ambient cooling air through the specially designed foot structure is preferably augmented by another cooling air flow enhancement feature of the present invention—namely a generally vertically extending outer hollow wall structure disposed on the housing. Representatively, this hollow wall structure is a hollow front bezel structure and has an open bottom end and a generally vertical inner side portion. Transfer opening means extend through this inner side portion and communicate the interior of the hollow wall structure with the interior housing space.

During operation of the cooling means, in addition to the ambient cooling air drawn through the housing interior via the hollow support foot, the cooling means also simultaneously function to create a second flow of ambient cooling air that sequentially enters the interior of the hollow wall structure through the open bottom end thereof, passes into the housing interior space through the transfer opening means, and is then discharged from the housing interior space through the ventilation air outlet opening means.

In accordance with yet another feature of the invention, the hollow wall structure has an upper interior portion, a lower interior portion communicating with the housing interior through the transfer opening means, and interior wall means forming an imperforate barrier between the upper and lower interior portions of the hollow wall structure. An electronic device mounted in the housing interior has a portion extending into the upper interior portion of the outer hollow wall structure above the interior wall means therein, such interior wall means acting as a barrier to prevent hot pieces of the electronic device from falling downwardly through the open bottom air inlet end of the hollow wall structure.

The unique combination of the two ambient air inlet paths extending through (1) the hollow support foot, and (2) the hollow exterior wall structure advantageously permits the cooling means driving force to be a single cooling fan operatively disposed within the housing of the electronic apparatus. In a preferred embodiment of the invention, this dual flow of ambient cooling air through the housing is further enhanced by a specially designed additional hollow wall structure incorporated in the housing.

This additional hollow wall structure includes a first exterior wall portion of the housing, an interior housing wall having opposite inner and outer sides and being spaced inwardly apart from the first exterior wall portion and forming therewith a plenum space, a cooling air inlet opening formed in the first exterior wall portion, and a cooling air transfer opening formed in the interior wall. A first printed circuit board, illustratively a computer motherboard, is mounted on the inner side of the interior wall. During operation of the cooling means, ambient air is sequentially drawn into the plenum space through the cooling inlet opening on the first exterior wall portion, exits the plenum space into the interior housing space through the cooling air transfer opening, flows parallel to and adjacent the inner side of the interior wall, and is then discharged outwardly through the aforementioned ventilation air outlet opening means.

The flow of cooling air along and generally parallel to the motherboard is preferably facilitated by the provision of baffle means within the housing interior. According to another aspect of the present invention, these baffle means are at least partially defined by a carrier structure interiorly supported in the housing and being removable therefrom through a housing access opening that faces the motherboard and is normally covered by a removable access wall.

A second printed circuit board, representatively a connector board, is supported on the carrier structure for movement therewith into and out of the housing interior with the second circuit board in a transverse relationship with the motherboard, the second printed circuit board having a connector portion removably mateable with a corresponding connector portion of the motherboard in response to operative insertion of the carrier structure into the housing interior. A third printed circuit board, representatively an option card, is removably and transversely coupled to the second printed circuit board for movement therewith into and out of the housing interior.

The carrier structure representatively has a wall portion extending generally transversely to the motherboard and having an inner edge portion spaced apart from the motherboard and forming an air flow gap therebetween. Preferably, the inner edge portion of the carrier structure wall portion has a notch formed therein and positioned adjacent to a heat-prone processor portion of the motherboard. The notch functions to enlarge a portion of the air flow gap adjacent the processor portion to thereby increase the amount of cooling air that passes along the processor portion during operation of the cooling means.

DETAILED DESCRIPTION

Figure 1:
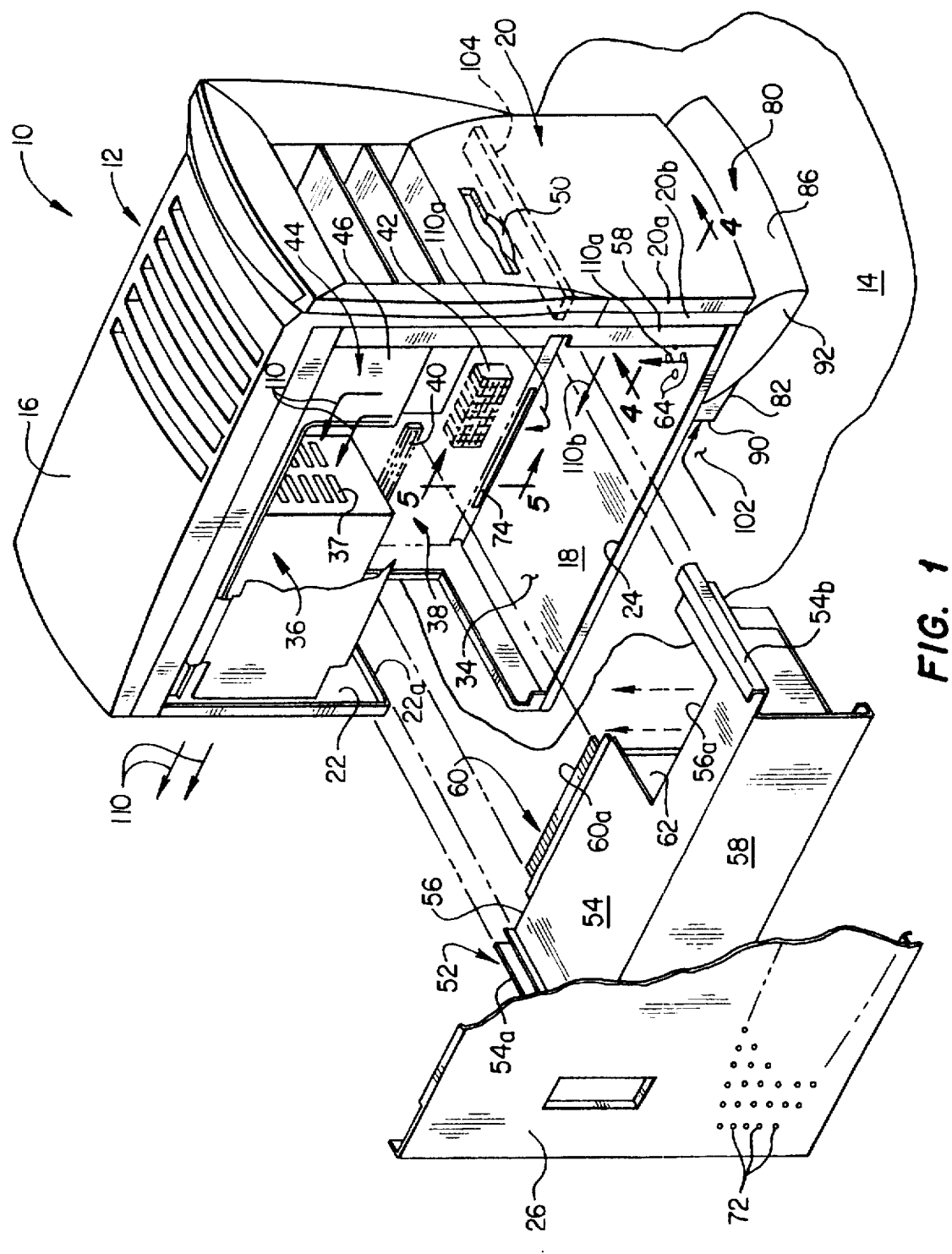
FIG. 1 is a partially exploded front and left side perspective view of a specially designed computer incorporating therein enhanced internal cooling apparatus embodying principles of the present invention.
Figure 2:
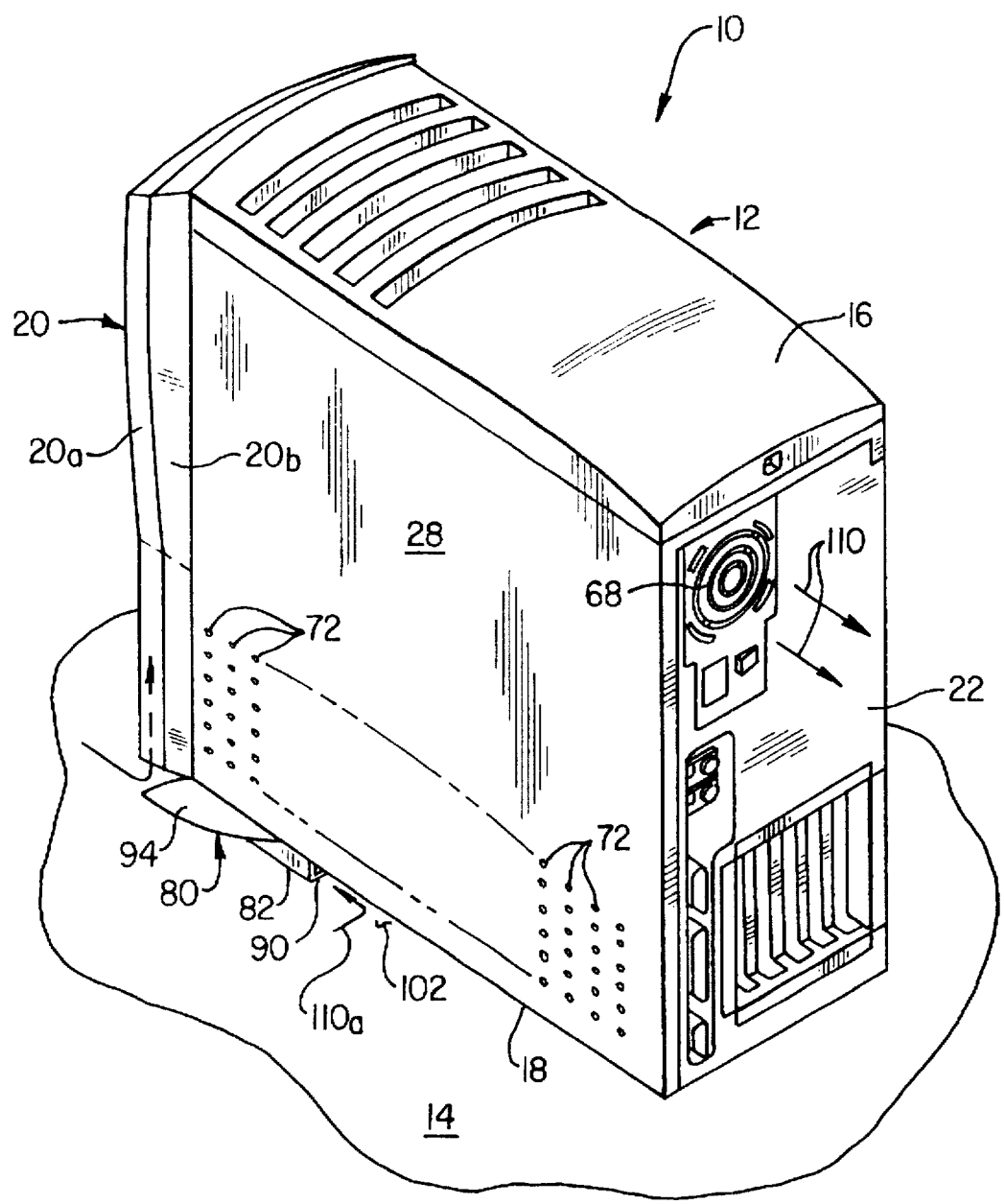
FIG. 2 is an assembled right and rear side perspective view of the computer.
Figure 3:
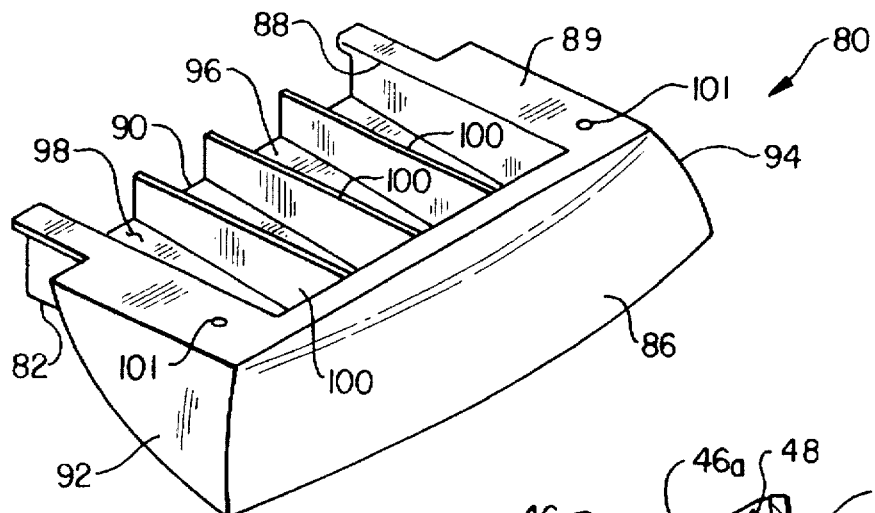
FIG. 3 is an enlarged scale perspective view of a support foot structure attached to the underside of the main housing portion of the computer.

Referring initially to FIGS. 1 and 2, the present invention provides in a preferred embodiment thereof a tower type computer 10 having uniquely enhanced interior cooling air flow capabilities. While principles of the present invention are incorporated in a tower type computer by way of illustration and example, it will appreciated by those of skill in this particular art that these principles, as subsequently discussed herein, could also be advantageously be incorporated in other electronic apparatus in which heat generating electronic components such as printed circuit boards may be installed, such as, for example, desktop computers.

Computer 10 includes a generally rectangularly configured hollow housing 12 restable atop a generally horizontal support surface 14 and including a top wall structure 16; a bottom wall 18; a hollow, vertically extending front wall structure 20 mounted over a vertically extending front side wall portion 21 of the housing (see FIG. 4); a rear wall 22; an open left vertical side 24 normally covered by a left removable access wall 26; a vertically extending right side wall 28; and an interior vertically extending wall 30 (see FIGS. 4 and 5) defining with the wall 28 a vertically extending plenum space 32.

Operatively mounted within the interior 34 of the housing 12 are a conventional single cooling fan 36 and a printed circuit board 38, representatively the motherboard of the computer 10. Cooling fan 36 has a rectangular configuration, is suitably supported in an upper rear corner portion of the housing interior 34, and has a forwardly facing inlet opening portion 37 and a rearwardly facing outlet opening portion (not visible in the drawings). Motherboard 38 is vertically mounted in the inner side of the interior wall 30, in a slightly elevated position relative to the bottom housing wall 18 (see FIG. 5) and has a connector socket portion 40 located generally rearwardly of a processor portion 42 of the motherboard (see FIG. 1).

As best illustrated in FIG. 1, a drive bay section 44 is mounted in a top front corner portion of the interior 34 of the housing 12. A representative disc drive 46 is representatively illustrated in the drive bay area 44 and has a front side portion 46a (see FIG. 4) that projects outwardly beyond the front housing wall 21 and projects into the interior 48 of the hollow front wall structure 20, with the front end of the disc drive portion 46a being positioned just rearwardly of a disc insertion slot 50 extending through the front side of the hollow wall structure 20 (see FIG. 1).

A specially designed option card carrier structure 52 (see FIG. 1) is horizontally insertable into and removable from the housing interior 34, via the housing side access opening 24, and has a horizontal top side wall 54 with an inner edge 56 thereon, and a downwardly extending vertical outer side wall 58. When carrier structure 52 is horizontally inserted into the housing interior 34 it is slidably supported therein by the receipt of a rear housing wall portion 22a within an end slot portion 54a of the top wall 54, and the receipt of a bent opposite end portion 54b of the top wall 54 in a complementarily configured front side housing wall notch 58 (see FIG. 1).

A connector board 60 is suitably mounted on the underside of the top side wall 54 of the card carrier member 52 and has a connector edge portion 60a removably mateable with the motherboard connector socket 40 and projecting outwardly beyond the top side wall inner edge 56. Connector edge portion 60a is positioned just to the left (as viewed in FIG. 1) of a rectangular notch 56a formed in the top side wall inner edge 56. At least one option card 62 is transversely and removably coupled to the underside of the connector board 60 for movement therewith into and out of the housing interior 34. As can be seen, this arrangement substantially improves the access to the option card(s) compared to conventional mounting techniques used to connect option cards to a motherboard within a computer housing.

When the option card carrier member 52 is operatively slid into place within the housing interior 34, the connector edge portion 60a is automatically and removably mated with the motherboard connector socket 40, and the inner edge 56 of the top card carrier wall 54 forms a small horizontal gap (not shown in the drawings) between the wall 54 and the motherboard 38. For purposes later described, the notch 56a serves to substantially widen this gap horizontally adjacent and somewhat above the heat-prone processor portion 42 of the motherboard 38.

A variety of cooling air flow openings, having roles subsequently discussed herein, are formed in the main body portion of the housing 12. These cooling air flow openings include ambient air inlet openings 64 formed in the bottom housing wall 18 adjacent the vertical front side wall 21 thereof (see FIGS. 1 and 4); ambient air inlet openings 66 formed in a bottom end portion of the vertical front housing side wall 21 (see FIG. 4); a rear outlet opening structure 68 (see FIG. 2) carried by the rear housing wall 22 and aligned with the rear outlet of the interior cooling fan 36; perforations 70,72 respectively formed in bottom portions of the left and right vertical exterior housing side walls 26,28 (see FIGS. 1 and 2); a horizontally elongated rectangular air transfer opening 74 (see FIGS. 1 and 5) formed in the vertical interior housing wall 30 and located just below the bottom edge of the motherboard 38; and a spaced series of small air transfer openings 76 (see FIG. 4) formed in a bottom front portion of the vertical interior housing wall 30 forwardly of the motherboard 38.

Referring now to FIGS. 1–4, the computer 10 also includes a specially designed hollow support foot structure 80 that is representatively a one piece plastic molding. Support foot structure 80 has a bottom side surface portion 82 lying generally in a plane 84; an upstanding front end portion 86; an open top side 88 horizontally bounded by a generally U-shaped upper side surface 89 lying generally in a plane that is rearwardly and downwardly tilted relative to the plane 84 (see FIG. 4); an open rear side 90; a pair of upstanding opposite side wall portions 92,94 extending rearwardly from the front portion 86; a base wall 96 vertically interposed between the bottom side 82 and the open top side 88 and being forwardly and downwardly sloped relative to the plane 84; a generally trough-shaped interior air flow passage 98 having an inlet at the open rear side 90 and an outlet at the open top side 88; and a spaced plurality of parallel, generally plate-shaped stiffening members in the form of ribs 100 projecting upwardly from the base wall 96.

The open rear side 90 of the support foot 80 is secured to a front underside portion of the housing 12, directly beneath the air inlet openings 64 in the bottom wall 18, by means of screws (not shown) extended upwardly through openings 101 (see FIG. 3) in the top side of the support foot and threaded into the bottom housing wall 18. When the computer is placed on the support surface 14 the front-mounted support foot 80 elevates a front end portion of the housing 12 in a manner creating between the support surface 14 and the underside of the housing 12 a generally triangularly cross-sectioned vertical gap 102.

Figure 4:
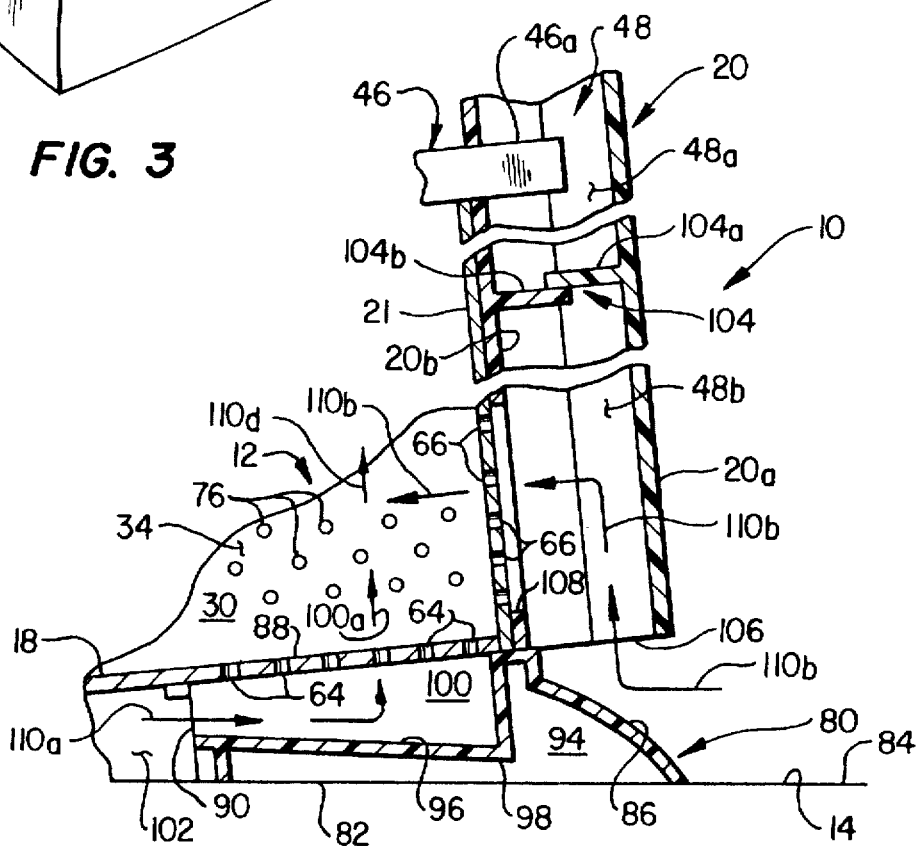
FIG. 4 is an enlarged scale, vertically foreshortened partial cross-sectional view taken through the computer generally along line 4—4 of FIG. 1.
Figure 5:
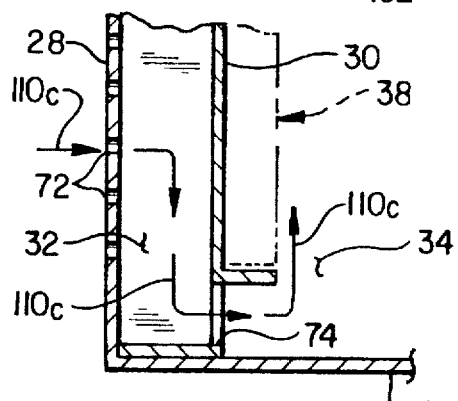
FIG. 5 is an enlarged scale partial cross-sectional view taken through the computer generally along line 5—5 of FIG. 1.

Turning now to FIG. 4, the previously mentioned hollow vertical front wall structure 20 is representatively a plastic bezel assembly comprising joined front and rear vertical wall sections 20a,20b respectively having inwardly projecting generally horizontal walls 104a,104b that horizontally overlap and together define an imperforate inner wall structure 104 that separates upper and lower portions 48a and 48b of the interior 48 of the hollow wall structure 20. As illustrated, the hollow wall structure 20 has an open lower end that defines an air inlet opening 106 leading upwardly into the bottom portion 48b of the hollow front wall structure interior 48. As in the case of the open rear side 90 of the support foot 80 (see FIG. 3), the air inlet opening 106 is concealed from normal computer user view.

The imperforate dividing wall structure 104 underlies the projecting front portion 46a of the disc drive 46 and serves to prevent any pieces thereof from falling downwardly through the air inlet opening 106. For purposes later described, an air inlet opening 108 is formed in the rear side of the wall portion 20b and forwardly overlies the air inlet openings 66 in the front housing side wall 21.

With the computer 10 in its assembled state shown in FIG. 2, and during operation of the cooling fan 36, a first flow 110a of ambient air 110 (see FIGS. 1, 2 and 4) is sequentially drawn inwardly through the vertical gap 102 beneath the tilted housing 12, flowed forwardly through the support foot interior passage 98 (see FIG. 3), drawn into the housing interior 34 via the bottom housing wall openings 64, flowed through the housing interior 34, and then discharged by the fan 36 outwardly through the rear housing outlet structure 68 (see FIG. 2).

At the same time, three other flows of ambient air are drawn through the housing interior 34 by the fan 36 and discharged through the outlet structure 68. Specifically, a second flow 110b of ambient air 110 is sequentially flowed upwardly through the open bottom inlet end 106 of the hollow front wall structure 20 (see FIG. 4), rearwardly into the housing interior 34 via the inlet openings 108 and 66, through the housing interior 34, and then outwardly through the rear outlet opening structure 68.

A third flow 110c of ambient air 110 (see FIG. 5) is sequentially flowed inwardly through the exterior side wall perforations 72 and into the plenum space 32, outwardly through the transfer opening 74 into the main housing interior 34, upwardly along the motherboard 38 and through the housing interior 34, and then outwardly through the rear outlet opening structure 68.

Finally, during the other three cooling flows of ambient air through the housing 12, a fourth flow 110d of ambient air 110 (see FIG. 4) is sequentially flowed inwardly through the housing side wall perforations 72 into the plenum 32 (see FIG. 5) and into the housing interior 34 through the air transfer openings 76, through the housing interior 34, and then outwardly through the rear outlet opening structure 68.

This unique plurality of separate cooling air flows through the housing interior 34 substantially reduces the housing air entrance resistance, thereby substantially reducing the power required to move the requisite degree of cooling air into, through and outwardly from the housing. Accordingly, as illustrated, a single cooling fan may be utilized instead of the multiple fans typically needed to adequately cool a desktop or tower type of computer. Additionally, the fan and air movement operating noise is also desirably reduced.

According to another feature of the present invention, the previously described option card carrier member 52 (see FIG. 1) not only serves to provide improved access to each option card 62, but when operatively installed in the housing interior 34 also serves as baffle means for controlling the interior housing flow of ambient cooling air. Specifically, in the illustrated embodiment of the computer 10, the multiple flows of ambient cooling air 110 described above representatively enter the housing interior at locations generally below the level of the top wall 54 of the installed option card carrier member 52, and pass upwardly along the motherboard 38, through the previously mentioned horizontal gap between the card carrier wall inner edge 56 and the motherboard 38 before entering the fan 36 and being discharged from the housing interior.

The use of this option card carrier-defined gap desirably directs the exiting ambient air cooling flow along the motherboard. In addition, however, the provision of the option card carrier top side wall edge notch 56a functions to concentrate this usefully positioned upward cooling air flow along the motherboard heat concentration area at its processor portion 42.

The foregoing detailed description is to be clearly understood as being given by way of illustration and example only, the spirit and scope of the present invention being limited solely by the appended claims.

What is claimed is:

1. Electronic apparatus comprising:

a housing within which a heat generating electronic device may be operatively disposed, said housing being restable on a generally horizontal support surface and having front and rear spaced apart vertical exterior wall portions, a bottom exterior wall portion extending between said front and rear vertical exterior wall portions, a ventilation air inlet opening formed in said bottom exterior wall portion adjacent said front vertical exterior wall portion, and ventilation air outlet opening means formed in an exterior wall portion spaced apart from said ventilation air inlet opening;

a hollow foot structure depending from said bottom exterior wall portion adjacent said front vertical exterior wall portion and underlying said first ventilation air inlet opening, said hollow foot structure being configured to engage the support surface in a manner positioning said bottom exterior wall portion in a downwardly and rearwardly sloped relationship with the support surface and creating a vertical gap between the support surface and the underside of said housing; and cooling means operative to sequentially flow ambient air through the interior of said hollow foot structure, into said housing through said first ventilation air inlet opening, and then outwardly from said housing through said ventilation air outlet opening means.

2. The electronic apparatus of claim 1 wherein said electronic apparatus is a computer having at least one heat generating electronic device operatively disposed within said housing.

3. The electronic apparatus of claim 1 wherein:

said cooling means include a single cooling fan operatively disposed in said housing.

4. Electronic apparatus comprising:

a housing within which a heat generating electronic device may be operatively disposed, said housing being restable on a generally horizontal support surface and having a bottom exterior wall portion, a first ventilation air inlet opening formed in said bottom exterior wall portion, a second exterior wall portion spaced apart from said bottom exterior wall portion, and ventilation air outlet opening means formed in said second exterior wall portion;

a hollow foot structure depending from said bottom exterior wall portion and underlying said first ventilation air inlet opening; and cooling means operative to sequentially flow ambient air through the interior of said hollow foot structure, into said housing through said first ventilation air inlet opening, and then outwardly from said housing through said ventilation air outlet opening means, said hollow foot structure being configured to engage the support surface in a manner creating a vertical gap between the support surface and the underside of said housing.

said cooling means being operative to flow the ambient air into said vertical gap before the ambient air is flowed through the interior of said hollow foot structure, and said hollow foot structure having a sloping base wall portion underlying said first ventilation air inlet opening in a downwardly spaced relationship therewith, said base wall portion having an upwardly facing top surface defining a bottom side of an air flow passage extending through said hollow foot structure.

5. The electronic apparatus of claim 4 wherein:

said hollow foot structure is a one piece plastic molding.

6. Electronic apparatus comprising:

a housing within which a heat generating electronic device may be operatively disposed, said housing being restable on a generally horizontal support surface and having a bottom exterior wall portion, a first ventilation air inlet opening formed in said bottom exterior wall portion, a second exterior wall portion spaced apart from said bottom exterior wall portion, and ventilation air outlet opening means formed in said second exterior wall portion;

a hollow foot structure depending from said bottom exterior wall portion and underlying said first ventilation air inlet opening;

cooling means operative to sequentially flow ambient air through the interior of said hollow foot structure, into said housing through said first ventilation air inlet opening, and then outwardly from said housing through said ventilation air outlet opening means; and a generally vertically extending outer hollow wall structure having an open bottom end and a generally vertical inner side portion, and transfer opening means extending through said inner side portion and communicating with the interior of said housing, said cooling means being further operative to cause ambient air to sequentially enter the interior of said hollow wall structure through said open bottom end thereof, pass into the interior of said housing through said transfer opening means, and then be discharged from said housing through said ventilation air outlet opening means.

7. The electronic apparatus of claim 6 wherein said electronic apparatus is a computer having at least one heat generating electronic device operatively disposed within said housing.

8. The electronic apparatus of claim 7 wherein:

said cooling means include a single cooling fan operatively disposed in said housing.

9. The electronic apparatus of claim 6 further comprising:

a generally vertically extending exterior wall section, an interior wall having opposite inner and outer sides and being spaced inwardly apart from said exterior wall section and forming therewith a plenum space, a second cooling air inlet opening formed in said exterior wall section, and a cooling air transfer opening formed in said interior wall, and said cooling means are further operative to flow ambient air sequentially into said plenum through said second cooling air inlet opening, exit said plenum through said cooling air transfer opening, flow parallel to and adjacent said inner side of said interior wall, and then be discharged through said ventilation air outlet opening means.

10. The electronic apparatus of claim 9 wherein said electronic apparatus is a computer having at least one heat generating electronic device operatively disposed within said housing.

11. The electronic apparatus of claim 9 wherein:

said electronic apparatus further comprises a printed circuit board mounted on said inner side of said interior wall.

12. The electronic apparatus of claim 11 further comprising:

baffle means disposed in the interior of said housing and being operative to cause air being flowed through said housing by said cooling means to be flowed generally along a side surface of said printed circuit board before being discharged outwardly through said ventilation air outlet opening means.

13. The electronic apparatus of claim 12 wherein:

said printed circuit board has a first connector portion thereon, said housing has an access opening formed therein and facing said inner side of said interior wall, and an access wall removable mountable over said access opening, and said electronic apparatus further comprises:

a carrier structure interiorly supported in said housing and being removable from the interior of said housing through said access opening, a second printed circuit board supported on said carrier structure for movement therewith into and out of the housing interior with said second printed circuit board in a transverse relationship with said first printed circuit board, said second printed circuit board having a second connector portion removably mateable with said first connector portion in response to insertion of said carrier into the interior of said housing through said access opening, and a third printed circuit board removably and transversely coupled to said second printed circuit board for movement therewith into and out of the interior of said housing.

14. The electronic apparatus of claim 13 wherein:

said baffle means are at least partially defined by said carrier structure.

15. Electronic apparatus comprising:

a housing structure having a bottom side portion restable on a generally horizontal support surface, an interior space within which a heat generating electronic device may be operatively disposed, a generally vertically extending outer hollow wall structure having an open bottom end and a generally vertical inner side portion, transfer opening means extending through said inner side portion and communicating the interior of said hollow wall structure with said interior housing space, an exterior wall portion, and air outlet opening means formed in said exterior wall portion; and cooling means for creating a flow of ambient air that sequentially enters the interior of said hollow wall structure through said open bottom end thereof, passes into said housing interior space through said transfer opening means, and is then discharged from said housing interior space through said air outlet opening means.

said generally vertically extending outer hollow wall structure having an upper interior portion, a lower interior portion communicating with said interior housing space through said transfer opening means, and interior wall means forming an imperforate barrier between said upper and lower interior portions.

16. The electronic apparatus of claim 15 wherein said electronic apparatus is a computer having a heat generating electronic device operatively disposed within said housing interior space.

17. The electronic apparatus of claim 15 wherein:
said hollow wall structure is an external bezel structure.

18. The electronic apparatus of claim 15 wherein:
said electronic apparatus is a computer, and
said electronic apparatus further comprises an electronic device mounted in said interior housing space and having a portion extending into said upper interior portion of said outer hollow wall structure above said interior wall means therein.

19. Electronic apparatus comprising:
a housing having an access opening across which a removable exterior first wall extends, and a second wall spaced apart from said first wall in a generally parallel, opposing relationship therewith;
a first printed circuit board disposed in the interior of said housing and mounted on said second wall in a facing relationship with said first wall, said first printed circuit board having a first connector portion thereon;
a carrier structure interiorly supported in said housing and being removable therefrom through said access opening;
a second printed circuit board supported on said carrier structure for movement therewith into and out of the housing interior with said second printed circuit board in a transverse relationship with said first printed circuit board, said second printed circuit board having a second connector portion removably mateable with said first connector portion in response to insertion of said carrier structure into the housing interior;
cooling means for creating a flow of cooling air through the interior of said housing; and
baffle means, disposed in the interior of said housing and at least partially defined by said carrier structure, for directing the flow of cooling air along and parallel to said first circuit board,
said carrier structure having a wall portion extending generally transversely to said first circuit board and having an inner edge portion spaced apart from said first circuit board and forming an air flow gap between said inner edge portion and said first circuit board,
said inner edge portion of said carrier structure wall portion having a notch formed therein and facing a predetermined heat generating location on said first circuit board, said notch serving to enlarge a portion of said air flow gap adjacent said predetermined heat generating location to thereby increase the amount of cooling air that passes along said predetermined heat generating location during operation of said cooling means.

20. The electronic apparatus of claim 19 wherein:
said electronic apparatus is a computer, and
said heat generating location on said first circuit board has a processor mounted thereon.

21. A hollow support foot connectable to an underside portion of the housing of an electronic device, such as a computer, and operative to elevate the underside portion above a generally horizontal support surface atop which the housing is rested, said support foot including a body portion comprising:
a bottom side surface portion restable on the support surface and lying generally in a first plane;
an upstanding front end portion;
an open top side securable to the underside portion of the housing, said open top side being rearwardly and downwardly sloped relative to said first plane;
a base wall vertically interposed between said bottom side surface portion and said open top side and having an upwardly facing top side surface; and
passage means for permitting ambient cooling air to sequentially flow inwardly into the interior of the hollow support foot above said base wall and then flow outwardly through said open top side.

22. The hollow support foot of claim 21 wherein:
said body portion is a one piece plastic molding.

23. The hollow support foot of claim 21 wherein:
said upwardly facing top side surface of said base wall slopes forwardly and downwardly relative to said first plane.

24. The hollow support foot of claim 21 wherein:
said body portion has a spaced pair of opposite side walls extending rearwardly from said upstanding front end portion, and
said passage means include a generally trough-shaped passage extending through the interior of said hollow support foot and opening outwardly through said open top side of said body portion, said passage having a rearwardly facing inlet and being forwardly bounded by an upper section of said front end portion, and horizontally bounded on opposite sides thereof by upper sections of said spaced pair of opposite side walls.

25. The hollow support foot of claim 24 further comprising:
a spaced plurality of stiffening ribs extending upwardly from said base wall.

26. The hollow support foot of claim 25 wherein:
said stiffening ribs have vertically oriented, generally plate-like configurations.

27. Electronic apparatus comprising:
a housing having an underside portion; and
a hollow support foot connected to said underside portion of said housing and operative to elevate said underside portion above a generally horizontal support surface atop which said housing is rested, said hollow support foot including a body portion including:
a bottom side surface portion restable on the support surface and lying generally in a first plane;
an upstanding front end portion;
an open top side securable to the underside portion of the housing, said open top side being rearwardly and downwardly sloped relative to said first plane;
a base wall vertically interposed between said bottom side surface portion and said open top side and having an upwardly facing top side surface; and
passage means for permitting ambient cooling air to sequentially flow inwardly into the interior of the hollow support foot above said base wall and then flow outwardly through said open top side.

28. The electronic apparatus of claim 27 wherein said electronic apparatus is a computer.

29. The electronic apparatus of claim 27 wherein said body portion is a one piece plastic molding.

30. The electronic apparatus of claim 27 wherein said upwardly facing top side surface of said base wall sloped forwardly and downwardly relative to said first plane.

31. The electronic apparatus of claim 27 wherein;
said body portion has a spaced pair of opposite side walls extending rearwardly from said upstanding front end portion, and said passage means include a generally trough-shaped passage extending through the interior of said hollow support foot and opening outwardly through said open top side of said body portion, said passage having a rearwardly facing inlet and being forwardly bounded by an upper section of said front end portion, and horizontally bounded on opposite sides thereof by upper sections of said spaced pair of opposite side walls.

32. The electronic apparatus of claim 31 further comprising a spaced plurality of stiffening ribs extending upwardly from said base wall.

33. The electronic apparatus of claim 32 wherein said stiffening ribs have vertically oriented, generally plate-like configurations.

* * * * *